United States Patent
Zhang et al.

(10) Patent No.: US 12,353,281 B2
(45) Date of Patent: Jul. 8, 2025

(54) ADDRESS EMBEDDING FOR ENCODER AND DECODER AND DATA PROCESSING METHOD THEREOF

(71) Applicant: SK hynix Inc., Icheon-si (KR)

(72) Inventors: Fan Zhang, San Jose, CA (US); Hongwei Duan, San Jose, CA (US); Haobo Wang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 69 days.

(21) Appl. No.: 18/358,488

(22) Filed: Jul. 25, 2023

(65) Prior Publication Data

US 2025/0036523 A1    Jan. 30, 2025

(51) Int. Cl.
*G06F 11/10*    (2006.01)
*G06F 11/07*    (2006.01)

(52) U.S. Cl.
CPC ...... *G06F 11/1068* (2013.01); *G06F 11/0772* (2013.01); *G06F 11/1048* (2013.01)

(58) Field of Classification Search
None
See application file for complete search history.

(56) References Cited

U.S. PATENT DOCUMENTS

2011/0239088 A1    9/2011    Post
2022/0075687 A1    3/2022    Jain

FOREIGN PATENT DOCUMENTS

WO    WO-2021230003 A1 *    11/2021    ............. G06F 12/10

* cited by examiner

*Primary Examiner* — Guerrier Merant
(74) *Attorney, Agent, or Firm* — IP & T GROUP LLP (57) ABSTRACT

A scheme for encoding and decoding a codeword into which address information is embedded. A write operation for this scheme includes generating tagging information including address information; encoding user information, meta information, the tagging information and additional shortened bits to generate parity information; generating a codeword including the user information, the meta information and the parity information; and storing the codeword in a memory device.

19 Claims, 9 Drawing Sheets

ADDRESS EMBEDDING FOR ENCODER AND DECODER AND DATA PROCESSING METHOD THEREOF

BACKGROUND

1. Field

Embodiments of the present disclosure relate to encoding and decoding schemes for a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since the memory devices have no moving parts. Examples of memory systems having such advantages include universal serial bus (USB) memory devices, memory cards having various interfaces such as a universal flash storage (UFS), and solid state drives (SSDs). Memory systems may use various types of encoding and decoding schemes.

SUMMARY

Aspects of the present invention include an apparatus and a method for encoding and decoding a codeword into which address information is embedded.

One aspect of the present invention includes a method of operating a memory system including a memory device, which includes performing write and read operations. The write operation includes generating tagging information including address information; encoding user information, meta information, the tagging information and additional shortened bits to generate parity information; generating a codeword including the user information, the meta information and the parity information; and storing the codeword in the memory device. The read operation includes reading the codeword read from the memory device; adding, to the read codeword, tagging information including firmware (FW) address information in firmware to generate a modified codeword; decoding, by a decoder, the modified codeword; determining whether the decoding is successful based on decoding status; and determining an address mismatch when the address information has been changed by the decoder; and reporting the address mismatch to the firmware.

Another aspect of the present invention includes a system includes a processor and a memory including instructions stored thereupon. The instructions upon execution by the processor cause an encoder and a decoder to: perform a write operation by the encoder and a read operation by the decoder. The write operation includes generating tagging information including address information; encoding user information, meta information, the tagging information and additional shortened bits to generate parity information; generating a codeword including the user information, the meta information and the parity information; and storing the codeword in the memory device. The read operation includes reading the codeword read from the memory device; adding, to the read codeword, tagging information including firmware (FW) address information in firmware to generate a modified codeword; decoding, by a decoder, the modified codeword; determining whether the decoding is successful based on decoding status; and determining an address mismatch when the address information has been changed by the decoder; and reporting the address mismatch to the firmware.

Additional aspects of the present invention will become apparent from the following description.

DETAILED DESCRIPTION

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete, and fully conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of the embodiments of the present invention is provided below along with accompanying figures that illustrate aspects of the present invention. The present invention is described in connection with such embodiments, but the present invention is not limited to any embodiment. The present invention encompasses numerous alternatives, modifications and equivalents to the embodiments disclosed. Numerous specific details are set forth in the following description in order to provide an understanding of the present invention. These details are provided for the purpose of example; the present invention may be practiced according to the claims without some or all of these specific details. For clarity, technical material that is known in technical fields related to the present invention has not been described in detail so that the present invention is not unnecessarily obscured.

Figure 1:
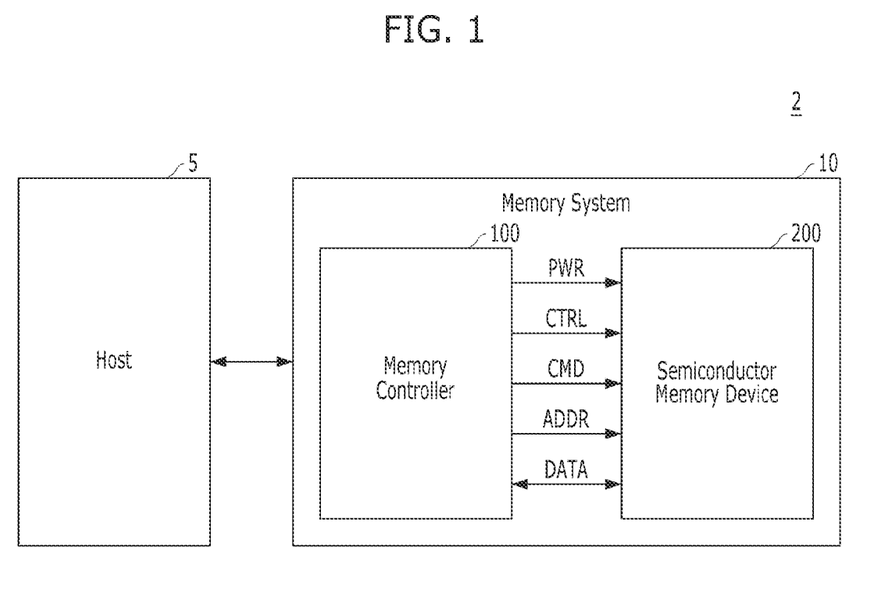
FIG. 1 is a block diagram illustrating a data processing system in accordance with an embodiment of the present invention.

FIG. 1 is a block diagram illustrating a data processing system 2 in accordance with an embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any of various types of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
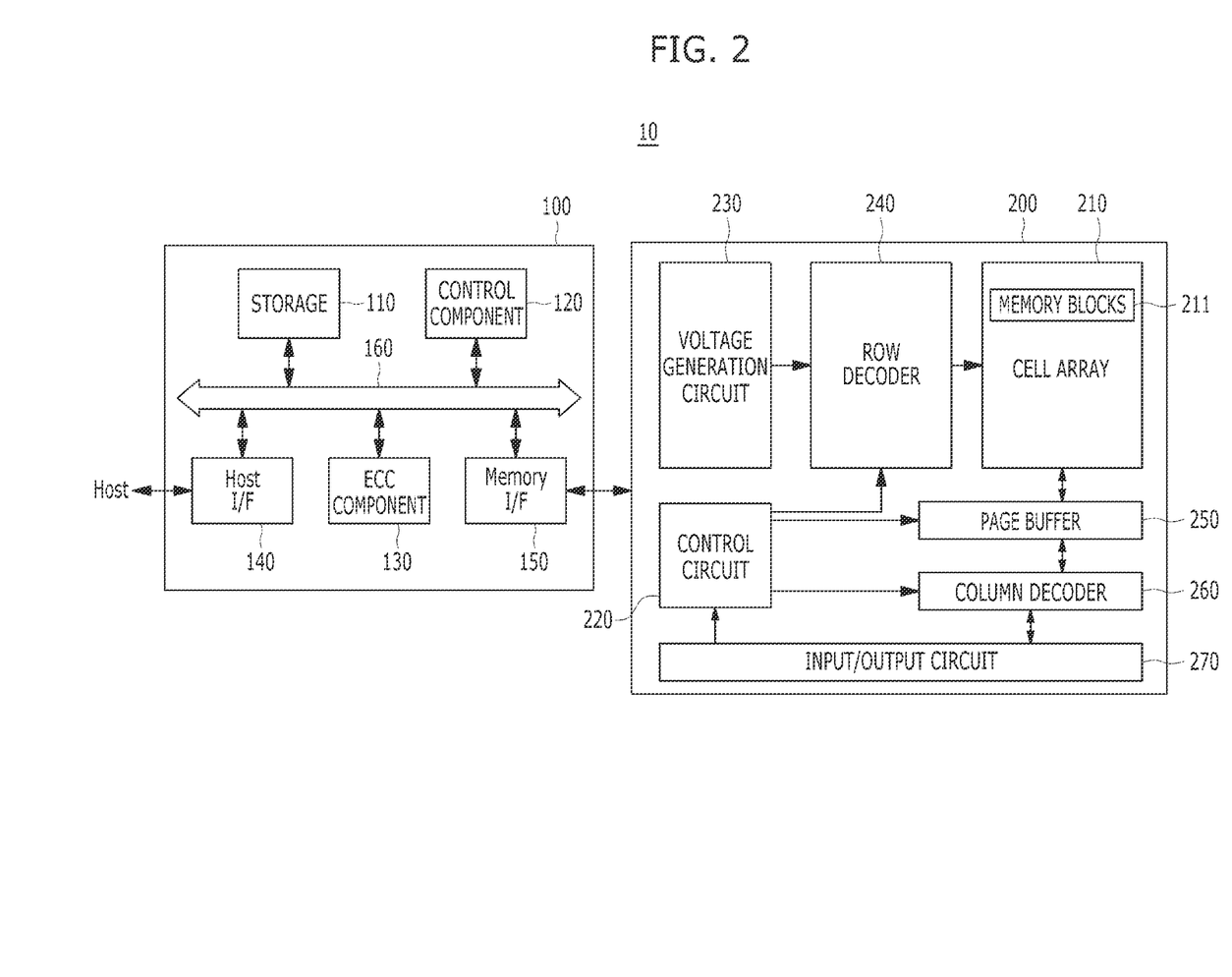
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120 which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200 in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various communication standards or interfaces such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250 which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
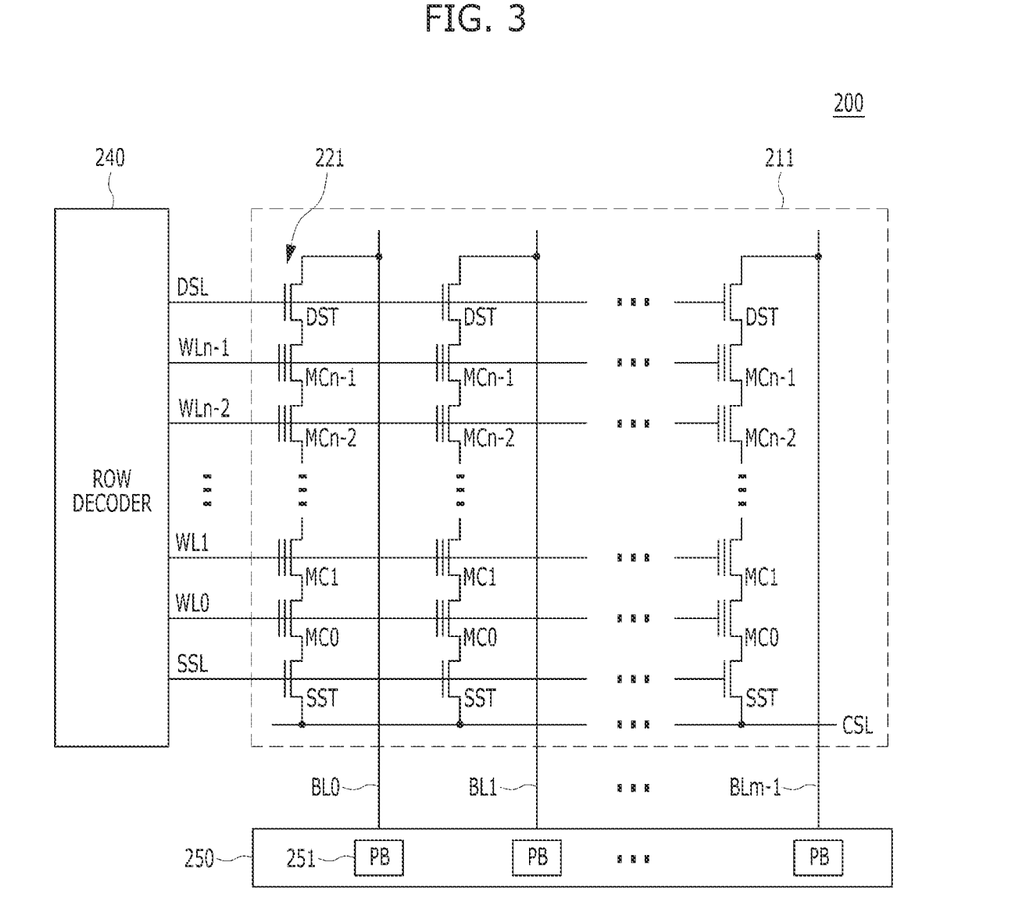
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to and receive data from, a selected memory block in program and read operations, or temporarily store transmitted data in response to page buffer control signal(s) generated by the control circuit 220.

The column decoder 260 may transmit data to and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn-1, a drain select line DSL and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 may temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
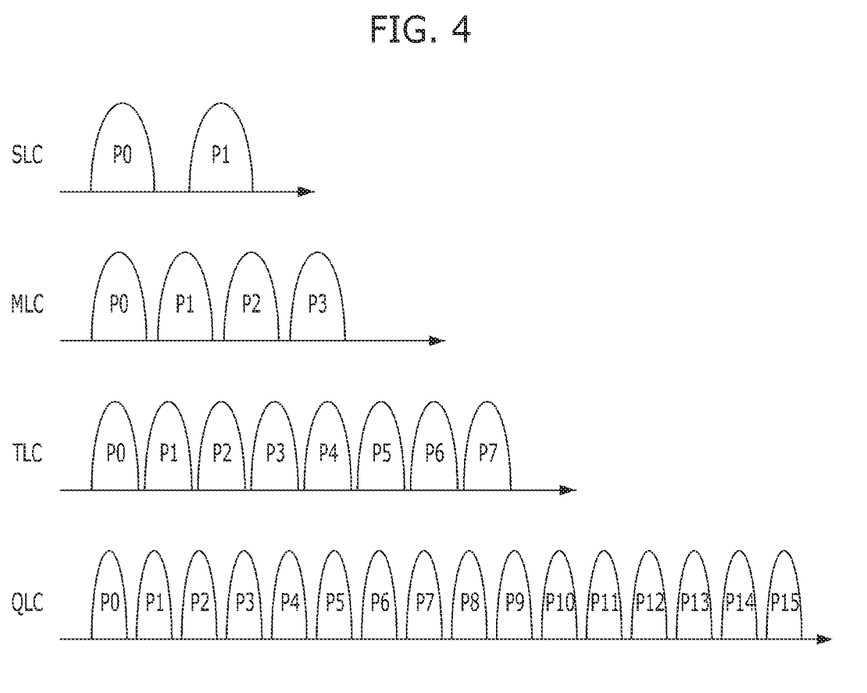
FIG. 4 is a diagram illustrating distributions of states for different types of cells of a memory device in accordance with an embodiment of the present invention.

FIG. 4 is a diagram illustrating distributions of states or program voltage (PV) levels for different types of cells of a memory device in accordance with an embodiment of the present invention.

Referring to FIG. 4, each of memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed using a coding scheme (e.g., Gray coding) in order to increase the capacity of the memory system 10 such as SSD.

Figure 5A:
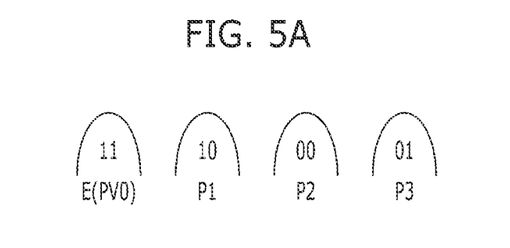
FIG. 5A is a diagram illustrating an example of Gray coding for a multi-level cell (MLC) in accordance with an embodiment of the present invention.

FIG. 5A is a diagram illustrating an example of coding for a multi-level cell (MLC) in accordance with an embodiment of the present invention.

Referring to FIG. 5A, an MLC may be programmed using a set type of coding. An MLC may have 4 program states, which include an erased state E (or PV0) and a first program state PV1 to a third program state PV3. The erased state E (or PV0) may correspond to "11." The first program state PV1 may correspond to "10." The second program state PV2 may correspond to "00." The third program state PV3 may correspond to "01."

Figure 5B:
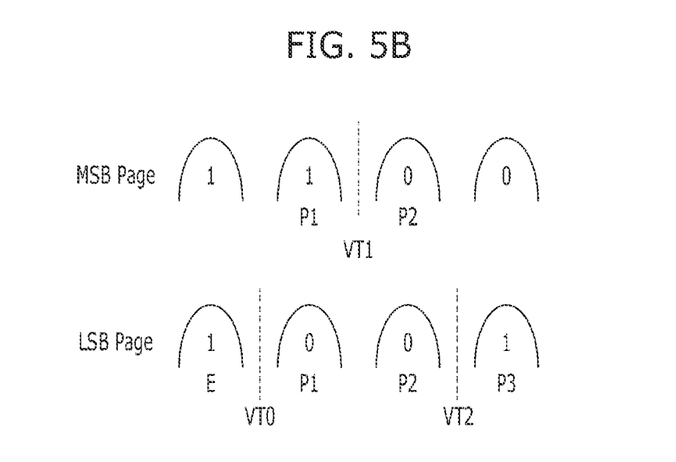
FIG. 5B is a diagram illustrating state distributions for pages of a multi-level cell (MLC) in accordance with an embodiment of the present invention.

In the MLC, as shown in FIG. 5B, there are 2 types of pages including LSB and MSB pages. 1 or 2 thresholds may be applied in order to retrieve data from the MLC. For an MSB page, the single threshold value is VT1. VT1 distinguishes between the first program state PV1 and the second program state PV2. For an LSB page, 2 thresholds include a threshold value VT0 and a threshold value VT2. VT0 distinguishes between the erased state E and the first program state PV1. VT2 distinguishes between the second program state PV2 and the third program state PV3.

Figure 6:
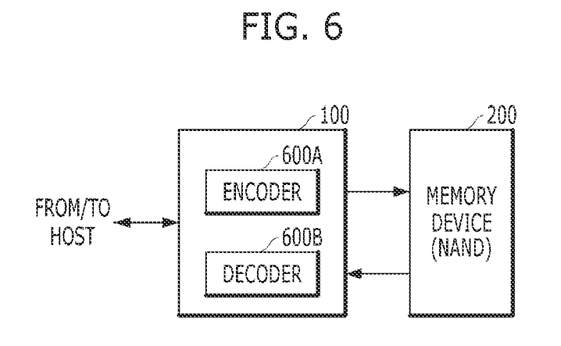
FIG. 6 is a diagram illustrating a memory system in accordance with an embodiment of the present invention.

FIG. 6 is a diagram illustrating a memory system in accordance with an embodiment of the present invention.

Referring to FIG. 6, the memory system may include a controller 100 and a memory device 200. The memory device 200 may include a NAND-type flash memory device with memory cells such as single-level cells (SLCs), multi-level cells (MLCs), triple-level cells (TLCs) or quadruple-level cells (QLCs). In various embodiments, the memory device 200 may include a NAND-type flash memory device with QLC memory cells (i.e., QLCs).

The controller 100 may receive a command from a host, and provide the memory device 200 with the received command. For example, the controller 100 receives a write command and write data corresponding to the write command, and controls the memory device 200 to perform a program operation on the write data. For another example, the controller 100 receives a read command, and controls the memory device 200 to perform a read operation on data corresponding to the read command. The controller 100 transmits read data corresponding to the read command to the host.

The controller 100 may include an encoder 600A, and a decoder 600B. During the program operation, the encoder 600A may perform an encoding operation on the write data based on a set encoding scheme. During the read operation, the decoder 600B may perform a decoding operation on the read data based on a set decoding scheme corresponding to the encoding scheme. The controller 100 may include a processor (e.g., the control component 120 of FIG. 2) and a memory (e.g., the storage 110 of FIG. 2) including instructions stored thereupon, wherein the instructions upon execution by the processor cause the decoder 600B to perform the decoding operation. The controller 100 and the memory device 200 may include various other components as shown in FIG. 2 and perform the operations described in FIGS. 1 and 2. In an embodiment, the encoder 600A and decoder 600B may be embodied in the ECC component 130 of the controller 100 shown in FIG. 2. Other suitable arrangements may be employed as well, as described below. In general, the encoder 600A and decoder 600B may be implemented by hardware, software, firmware, or any suitable combination thereof.

The controller 100 may include a write processor and a read processor. The write processor may perform a write operation for data to be stored in the memory device 200. During the write operation, the write processor may encode data and write the encoded data to the memory device 200. In some embodiments, the write processor may include the encoder 600A, for example, an LDPC encoder performing LDPC encoding.

During the read operation, the read processor may read data from the memory device 200, which may include some noise or errors, and perform error correction for the read data. In some embodiments, the read processor may include the decoder 600B, for example, an LDPC decoder performing LDPC decoding. The read processor may also perform BF decoding and MS decoding. The read processor may include a receiver (not shown) for receiving data from the memory device 200.

When the stored data in the memory device 200 is requested or otherwise desired (e.g., by an application or user which stored the data), the LDPC decoder may receive data from the memory device 200. The received data may include some noise or errors. The LDPC decoder may perform detection on the received data and output decision and/or reliability information. The LDPC decoder may include one of a soft detector and a hard detector. Either the soft detector or the hard detector can provide channel information for decoders, such as the LDPC decoder. For example, the soft detector may output reliability information and a decision for each detected bit. On the other hand, the hard detector may output a hard decision on each bit without providing corresponding reliability information. As an example, the hard detector may output as the hard decision that a particular bit is a "1" or a "0" without indicating how certain or sure the detector is in that decision. In contrast, the soft detector may output a decision and reliability information associated with the decision. In general, reliability information indicates how certain the detector is in a given decision. In one example, a soft detector may output a log-likelihood ratio (LLR) where the sign indicates the decision (e.g., a positive value corresponds to a "1" decision and a negative value corresponds to a "0" decision) and the magnitude indicates how sure or certain the detector is in that decision (e.g., a large magnitude indicates a high reliability or certainty).

Also, the LDPC decoder may perform LDPC decoding using the decision and/or reliability information. The LDPC decoder may include one of a soft decoder and a hard decoder. The soft decoder utilizes both the decision and the reliability information to decode the codeword. The hard decoder utilizes only the decision values to decode the codeword. The decoded bits generated by the LDPC decoder are transmitted to the appropriate entity (e.g., the user or application which requested it). With proper encoding and decoding, the information bits match the decoded bits.

In various embodiments, the system shown in FIG. 6 may be implemented using a variety of techniques including an application-specific integrated circuit (ASIC), a field-programmable gate array (FPGA), and/or a general purpose processor (e.g., an Advanced RISC Machine (ARM) core).

In an example, the encoder 600A of FIG. 6 may generate a codeword as encoded data and write the codeword to the memory device 200. One example format of the codeword is shown in FIG. 7A.

Figure 7A:
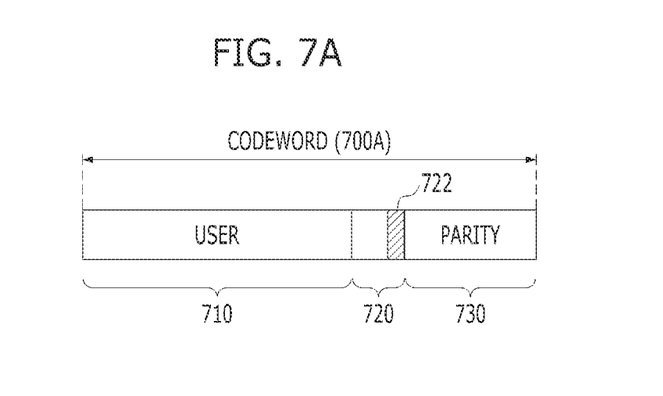
FIG. 7A is a diagram illustrating an example structure of a codeword used for the memory system of FIG. 6.

In the illustrated in FIG. 7A, the codeword 700A may include user information (i.e., user data bits) 710, meta information (i.e., meta data bits) 720 and parity information (i.e., parity bits) 730. In some systems, host logical block address (LBA) may be stored as a part 722 of the meta information 720 in the codeword 700A and may be written to the memory device (i.e., NAND) 200. In other systems, the physical block address (PBA) may be stored as a part 722 of the meta information 720 in the codeword 700A and may be written to in NAND. For example, 32 bits of LBA may be stored in NAND. For another example, 48 bits of PBA may be stored in NAND. The part 722 may be LBA or/and PBA bits.

In a write path, the user information 710 together with the meta information 720 may be encoded by the encoder 600A to generate the parity information 730. In an example, the codeword 700A may be generated by LDPC codes. In other words, the user information 710 and the meta information 720 may be protected by LDPC codes, and the parity information 730 may be LDPC parity.

In a read path, after decoding, the decoded LBA and PBA will be used to compare to the copy that firmware (FW) used when issuing a read command. In an example, the address information (i.e., LBA and PBA) may be maintained by FW of the controller 100. The address information may be compared to the copy obtained from NAND in the read path to detect certain FW bug or mishandling in FW and address corruption in the NAND. If a match of both LBA and PBA is detected, then no error will be reported to a host. If a mismatch of LBAs is detected, it is determined that the data being read back is not what a host wants. Thus, FW will report an uncorrectable error correction code (UECC) event with LBA mismatch. In such case, sometimes it is desirable to know what was the wrong physical address used during the read operation. For example, there may be a physical address (PA) mismatch issue, in which the physical address may be corrupted inside the NAND so that the NAND will fetch data from a wrong address. It is desirable to know the wrong PA for failure analysis and debugging. That is, PA mismatch detection and report schemes associated with a wrong PA are needed.

Instead of storing address information (i.e., LBA or/and PBA) in NAND, embodiments of the present invention provide a scheme for efficiently encoding and decoding a codeword having a different format from a typical codeword such as shown in FIG. 7A. According to this scheme, such address information is embedded into a codeword so that the address information is not stored in a memory device (e.g., NAND). Thus, during decoding, since address information can be recovered without reading from the memory device, there is no loss in correction of the address information. Embodiments of the present invention also provide several schemes that utilize the saved part of a codeword to help a decoder to process data in a more intelligent way than possible using the codeword scheme of FIG. 7A. Thus, throughput improvement of between 20% to 25% may be expected.

Figure 7B:
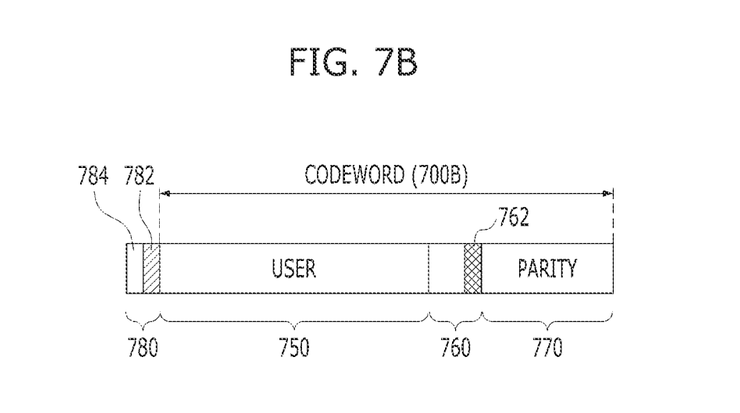
FIG. 7B is a diagram illustrating a format of a codeword in accordance with an embodiment of the present invention.

FIG. 7B is a diagram illustrating a format of a codeword 700B in accordance with an embodiment of the present invention.

Referring to FIG. 7B, the codeword 700B may include user information (i.e., user data bits) 750, meta information (i.e., meta data bits) 760 and parity information (i.e., parity bits) 770. In comparison to the format 700A of FIG. 7A, the meta information 760 of the codeword 700B does not include the field 722 for address information. That is, the field 722 for address information is removed from the codeword 700B. Instead, the meta information 760 may include a field 762, which becomes free for other uses as described below. Typically, the meta information 760 may include meta data such as information on the properties of the information stored in a memory device (e.g., NAND flash memory) and may include information for managing the stored information. For example, the meta data may include information indicating an erase status for each block, a validity for each page and a write count for each page, and information for bad block management. Thus, the meta information 760 may include typical meta data and the field 762.

In embodiments of the present invention, for encoding and decoding, tagging information 780 may be embedded to the codeword 700B. The tagging information 780 may be included in an additional column or columns of payload bits with shortened bits to store address information.

In some embodiments, the tagging information 780 may include address information 782 and shortened bits 784. In other embodiments, the tagging information 780 may exclude shortened bits 784. In an example, the address information 782 may be LBA bits. In another example, the address information 782 may be LBA or/and PBA bits. The address information 782 may be appended by the shortened bits 784. In an embodiment, the shortened bits 784 may be all 0s with a maximum reliability magnitude. In some embodiments, the LDPC encoding is working on the data with a boundary of a circulant size (e.g., 256 bits). If address information is not on the circulant boundary, shortened bits are required to be appended to make it on the boundary. They are called shortened bits because they are used for encoding but skipped being with written on NAND. In an embodiment, making shortened bits (e.g., all 0s) is arbitrary. During decoding, those shortened bits (e.g., all 0s) are added back. The maximum reliability magnitude means that these all 0s bits has a highest confidence level.

In a write path by the encoder 600A of the controller 100 of FIG. 6, the address information 782 may be appended by certain number of shortened bits 784 to generate the tagging information 780. The tagging information 780 may be encoded together with user information 750 and meta information 760 to generate parity information 770.

In a read path by the decoder 600B of the controller 100 of FIG. 6, the information 784 may be initialized to all 0s with a maximum reliability magnitude. The address information 782 may be initialized to the expected LBA or/and PBA that FW uses to issue a read command. The rest bits of the codeword 700B may be initialized to the same as normal decoding procedure. Since the address information 782 and the information 784 are known to the decoder 600B and the information 784 is initialized as shortened bits, there is no loss in correction compared to a decoding scheme for the codeword 700 of FIG. 7A. After decoding, the address information (i.e., LBA or/and PBA) may be extracted and compared to FW's copy for detection and reporting purpose.

As described above, by changing from the original codeword 700A to the new codeword 700B, some additional bytes (i.e., the field 762) in the codeword 700B are free. In some embodiments, there can be many ways to use (or reserve) these additional bytes for different purposes.

In an embodiment, the field 762 may be used as additional parity bits for LDPC codes. This can be done by adding additional parity column or columns to the parity check matrix and a puncture part of the column. That is, during encoding, the embodiment can add additional parity column. After encoding, the embodiment can store part of the additional parity column by throwing away the other part (i.e., puncturing). As such, changing the circulant size of the parity check matrix by adding the additional parity column so that the entire payload (i.e., codeword) can be aligned to a circulant boundary is another way to utilize the field 762 as parity bits.

In an embodiment, the field 762 may be used as parity bits of an inner code, for example a BCH code, on the payload except the field 762 of the LDPC code. The inner code can be designed to protect the entire payload, or a portion (often referred to as the weak portion) of the payload.

It is often that the errors remaining are sparse, and a decoder may spend many cycles before reaching the error bits to correct them. The errors are also likely to be located on weaker bits due to the uneven error protection from the code. Thus, it would be desirable to detect if a portion of a codeword has already converged, in which case a decoder can skip decoding them and set their reliability to a maximum. This process may save decoding cycles and also assist in clearing the remaining errors. In one example of how to design such a cyclic redundancy check (CRC), an embodiment can use 4 bytes of the field 762 as CRC (i.e., 32 bits CRC) for high weight columns in the LDPC codes. The high weight columns typically converge very quickly (in 1-2 iterations) and a decoder usually spends 3 to 4 times of cycles on a high weight column compared to a normal column. The CRC checking can be done every iteration and a decoder may skip high weight columns after CRC is passing.

In an embodiment, some bits of the field 762 may be used to have CRC for one or more high weight columns, and may be used to have the rest bits of the field 762 as parity bits of an inner code to enhance low weight columns. Low weight columns typically converge very slowly. This combination of using CRC and parity bits of an inner code on weaker bits can help boost correction and throughput.

Figure 8:
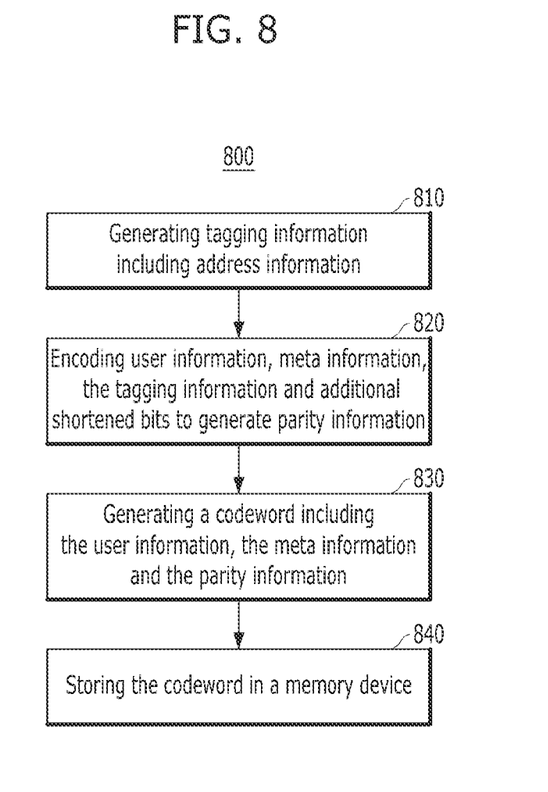
FIG. 8 is a flowchart illustrating a method for operating a memory system in accordance with an embodiment of the present invention.

FIG. 8 is a flowchart illustrating a method 800 for operating a memory system in accordance with an embodiment of the present invention. In an embodiment, the system may include a processor (e.g., the control component 120 of FIG. 2) and a memory (e.g., the storage 110 of FIG. 2) including instructions stored thereupon. The instructions upon execution by the processor may cause an encoder (e.g., the encoder 600A of FIG. 6) to perform a write operation of FIG. 8.

The method 800 includes, at operation 810, generating tagging information including address information.

The method 800 includes, at operation 820, encoding user information, meta information, the tagging information and additional shortened bits (e.g., 0s) to generate parity information.

The method 800 includes, at operation 830, generating a codeword including the user information, the meta information and the parity information.

The method 800 includes, at operation 840, storing the codeword in a memory device (e.g., the memory device 200 of FIG. 6).

Figure 9:
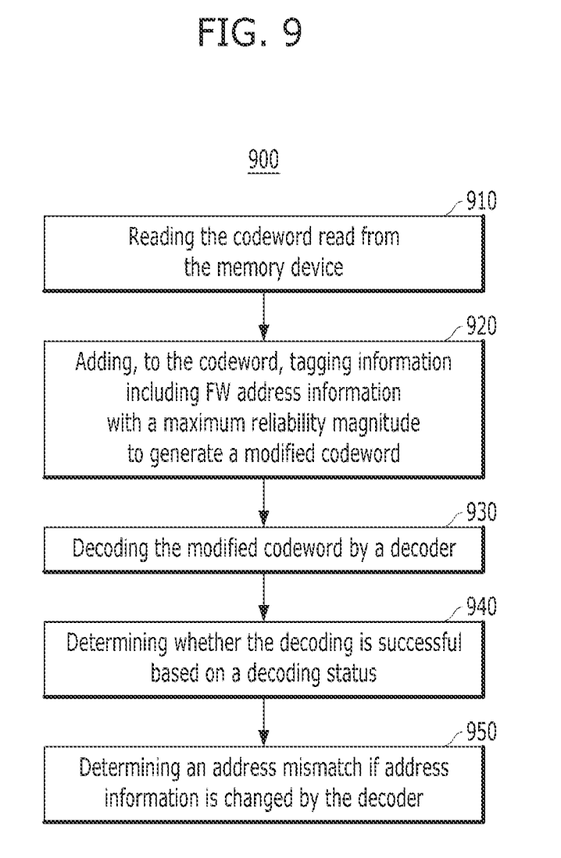
FIG. 9 is a flowchart illustrating a method for operating a memory system in accordance with an embodiment of the present invention.

FIG. 9 is a flowchart illustrating a method 900 for operating a memory system in accordance with an embodiment of the present invention. In an embodiment, the system may include a processor (e.g., the control component 120 of FIG. 2) and a memory (e.g., the storage 110 of FIG. 2) including instructions stored thereupon. The instructions upon execution by the processor may cause a decoder (e.g., the decoder 600B of FIG. 6) to perform a read operation of FIG. 9.

The method 900 includes, at operation 910, reading the codeword read from the memory device.

The method 900 includes, at operation 920, adding, to the codeword, tagging information including FW address information with a maximum reliability magnitude to generate a modified codeword. Further, the method 900 includes adding certain number of shortened bits (e.g., 0s) with a maximum reliability magnitude to the codeword.

The method 900 includes, at operation 930, decoding the modified codeword by a decoder.

The method 900 includes, at operation 940, determining whether the decoding is successful based on a decoding status (or decoding result).

The method 900 includes, at operation 950, determining an address mismatch if address information is changed by the decoder. Further, if address mismatch happens, the method 900 includes reporting address information from the decoder to FW.

In an embodiment, the input of the decoder may include "FW address+padded shortened bits (i.e., 0s)+read data from NAND", which consists a LDPC codeword with noise that the decoder will be working on. After decoding, the output of the decoder may include: "Modified FW address+modified Padded shortened bits (i.e., 0s)+modified read data from NAND". In normal case when data is read from correct physical address of NAND, the decoder will only modify/correct "read data from NAND". In this case, "FW address" is the same as "Modified FW address". In the case when data is read from wrong physical address of NAND, the decoder, instead of seeing "read data from NAND" is wrong, sees that FW address is wrong and it will try to correct it in order to make decoding successful. This is because "read data from NAND" is the majority of codeword. In an embodiment, the decoder (e.g., an LDPC decoder) may report the modified FW address after decoding, which could be the address information where read NAND data is mistakenly from.

In an embodiment, the address information appended by the additional shortened bits. In an embodiment, wherein the shortened bits are all zeros.

In an embodiment, the meta information excludes address bits.

In an embodiment, the meta information includes a field reserved for additional parity bits. In an embodiment, the additional parity bits include parity bits for an LDPC code. In an embodiment, the additional parity bits include parity bits for high weight columns of the LDPC code. In an embodiment, the additional parity bits include parity bits for an inner code.

As described above, embodiments provide a scheme for efficiently encoding and decoding a codeword having a different format from a typical codeword. According to the scheme, address information is embedded into a codeword so that the address information is not stored in a memory device (e.g., NAND). Thus, during decoding, since address information can be recovered without reading from the memory device, there is no loss in correction of the address information. Further, embodiments of the present invention provide several schemes that utilize the saved part of a codeword to help a decoder to process data in a more intelligent way. Thus, throughput of a system is improved.

Although the foregoing embodiments have been illustrated and described in some detail for purposes of clarity and understanding, the present invention is not limited to the details provided. There are many alternative ways of implementing the invention, as one skilled in the art would recognize in light of the foregoing disclosure. The disclosed embodiments are thus illustrative, not restrictive. The present invention is intended to embrace all modifications and alternatives that fall within the scope of the claims. Furthermore, the embodiments may be combined to form additional embodiments.

Indeed, implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of operating a memory system including a memory device, the method comprising:
    performing write and read operations,
    wherein the write operation includes,
    generating tagging information including address information and shortened bits added to the address information;
    encoding a) user information, b) meta information, and c) the tagging information including the shortened bits added to the address information to generate parity information;
    generating a codeword including the user information, the meta information and the parity information; and
    storing the codeword in the memory device,
    wherein the read operation includes,
    reading the codeword read from the memory device;
    adding, to the read codeword, tagging information including firmware (FW) address information in firmware to generate a modified codeword;
    decoding, by a decoder, the modified codeword;
    determining whether the decoding is successful based on decoding status;
    determining an address mismatch when the firmware address information has been changed by the decoder; and
    reporting the address mismatch to the firmware.

2. The method of claim 1, wherein the address information is appended to the codeword and includes the shortened bits.

3. The method of claim 1, wherein the firmware address information has a maximum reliability magnitude.

4. The method of claim 1, wherein the shortened bits are all zeros, and the number of the shortened bits has a maximum reliability magnitude.

5. The method of claim 1, wherein the meta information excludes address bits.

6. The method of claim 1, wherein the meta information includes a field reserved for additional parity bits.

7. The method of claim 6, wherein the additional parity bits include parity bits for a low density parity check (LDPC) code.

8. The method of claim 7, wherein the additional parity bits include parity bits for high weight columns of the LDPC code.

9. The method of claim 6, wherein the additional parity bits include parity bits for an inner code.

10. A system comprising:
    a processor and a memory including instructions stored thereupon, wherein the instructions upon execution by the processor cause an encoder and a decoder to:
    perform a write operation by the encoder and a read operation by the decoder,
    wherein the write operation includes,
    generating tagging information including address information and shortened bits added to the address information;

encoding a) user information, b) meta information, and c) the tagging information including the shortened bits added to the address information to generate parity information;

generating a codeword including the user information, the meta information and the parity information; and storing the codeword in a memory device, wherein the read operation includes, reading the codeword read from the memory device;

adding, to the read codeword, tagging information including firmware (FW) address information in firmware to generate a modified codeword;

decoding, by a decoder, the modified codeword;

determining whether the decoding is successful based on decoding status;

determining an address mismatch when the firmware address information has been changed by the decoder; and reporting the address mismatch to the firmware.

11. The system of claim 10, wherein the address information is appended to the codeword and includes the shortened bits.

12. The system of claim 10, wherein the firmware address information has a maximum reliability magnitude.

13. The system of claim 10, wherein the shortened bits are all zeros, and the number of the shortened bits has a maximum reliability magnitude.

14. The system of claim 10, wherein the meta information excludes address bits.

15. The system of claim 10, wherein the meta information includes a field reserved for additional parity bits.

16. The system of claim 15, wherein the additional parity bits include parity bits for a low density parity check (LDPC) code.

17. The system of claim 16, wherein the additional parity bits include parity bits for high weight columns of the LDPC code.

18. The system of claim 15, wherein the additional parity bits include parity bits for an inner code.

19. A method for generating a codeword for use in a memory system including a memory device, the method comprising:

generating tagging information including address information and shortened bits added to the address information;

encoding a) user information, b) meta information, and c) the tagging information including the shortened bits added to the address information to generate parity information;

including the user information, the meta information, the parity information and the shortened bits in the codeword; and storing the codeword in the memory device, wherein the number of the shortened bits has a maximum reliability magnitude, and the address information is appended in the codeword by the shortened bits.

* * * * *